(12) United States Patent
Takayama et al.

(10) Patent No.: US 7,144,452 B2
(45) Date of Patent: Dec. 5, 2006

(54) INK JET BLACK INK, INK SET, INK JET RECORDING METHOD, INK CARTRIDGE, RECORDING UNIT, AND INK JET RECORDING APPARATUS

(75) Inventors: Hideki Takayama, Fujisawa (JP); Kumiko Mafune, Kawasaki (JP); Daiji Okamura, Yokohama (JP); Shin-ichi Sato, Kawasaki (JP); Jun Yoshizawa, Tokyo (JP); Kunihiko Nakamura, Gotenba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/321,644

(22) Filed: Dec. 30, 2005

(65) Prior Publication Data

US 2006/0156952 A1    Jul. 20, 2006

Related U.S. Application Data

(63) Continuation of application No. PCT/JP2005/012708, filed on Jul. 4, 2005.

(30) Foreign Application Priority Data

Jul. 2, 2004    (JP)    .............. 2004-196448
Jun. 30, 2005    (JP)    .............. 2005-192194

(51) Int. Cl.
*C09D 11/02* (2006.01)
*B41J 2/01* (2006.01)

(52) U.S. Cl. .............. 106/31.52; 106/31.58; 347/100

(58) Field of Classification Search .............. 106/31.52, 106/31.58; 347/100; 534/805, 806
See application file for complete search history.

(56) References Cited

U.S. PATENT DOCUMENTS

| 4,202,870 | A | | 5/1980 | Weber et al. ............... 123/630 |
|---|---|---|---|---|
| 4,242,271 | A | | 12/1980 | Weber et al. ............... 260/448 |
| 4,295,889 | A | * | 10/1981 | Eida et al. ............... 106/31.52 |
| 4,391,960 | A | | 7/1983 | Kleine et al. ............... 526/74 |
| 4,426,226 | A | * | 1/1984 | Ohta et al. ............... 106/31.51 |
| 5,092,926 | A | * | 3/1992 | Owatari ............... 106/31.51 |
| 5,127,946 | A | | 7/1992 | Eida et al. ............... 106/22 |
| 5,215,577 | A | | 6/1993 | Eida et al. ............... 106/22 |
| 5,530,105 | A | * | 6/1996 | Yamazaki et al. ....... 106/31.49 |
| 6,086,660 | A | * | 7/2000 | Mukaiyama et al. .... 106/31.43 |
| 2006/0102048 | A1 | * | 5/2006 | Nakamura et al. ....... 106/31.52 |
| 2006/0119684 | A1 | * | 6/2006 | Mafune et al. ............. 347/100 |
| 2006/0144288 | A1 | * | 7/2006 | Ohno et al. ............... 106/31.27 |
| 2006/0146108 | A1 | * | 7/2006 | Sato et al. ................ 347/100 |

FOREIGN PATENT DOCUMENTS

| JP | S57-44605 | | 3/1982 |
|---|---|---|---|
| JP | 08-26263 | | 1/1996 |
| JP | 10-204308 | A | 8/1998 |
| JP | 02919615 | | 4/1999 |
| JP | 2000-290552 | | 10/2000 |
| JP | 2000-318300 | | 11/2000 |
| JP | 2002-275380 | | 9/2002 |
| JP | 2003-292808 | | 10/2003 |
| JP | 2005-036164 | * | 2/2005 |
| JP | 2005-36222 | A | 2/2005 |
| WO | WO 2004/078860 | | 9/2004 |

OTHER PUBLICATIONS

Shozo Asahara, "Solvent Handbook," published by Kodansha Ltd., Mar. 10, 1976, first edition, p. 750.
RN546079-42-9 Registry, copyright 2006 ACS on STN., Jul. 2003.
RN554433-03-3 Registry, copyright 2006 ACS on STN., Jul. 2003.

* cited by examiner

Primary Examiner—Helene Klemanski
(74) Attorney, Agent, or Firm—Fitzpatrick, Cella, Harper & Scinto

(57) ABSTRACT

The present invention aims to provide an ink jet black ink which can improve weatherability, optical density and sticking recovery property of nozzles of a recording head. According to the present invention, an ink jet black ink is provided which comprises at least a coloring-material and a water-soluble organic solvent, wherein the coloring material is a compound represented by the following general formula (I) or a salt thereof, and the water-soluble organic solvent is a water-soluble organic solvent having a relative permittivity of from 30.0 or more to less than 70.0 at 20° C. and capable of dissolving the compound represented by the following general formula (I) or a salt thereof, by 1.0 mass % or more at 25° C., and is in a content of 50.0 mass % or more with respect to the total content of all water-soluble organic solvents contained in the ink jet black ink

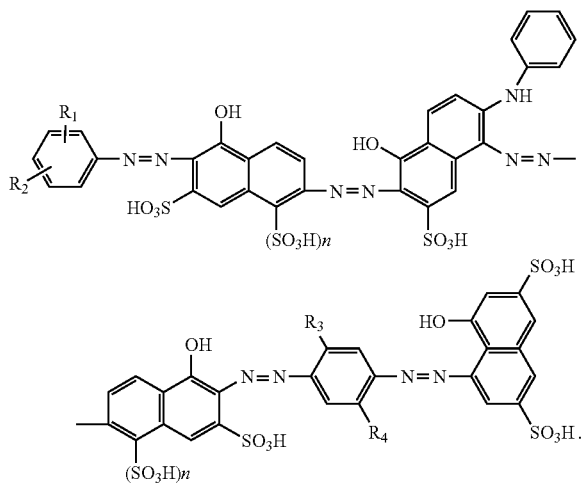

General formula (I)

7 Claims, 6 Drawing Sheets

INK JET BLACK INK, INK SET, INK JET RECORDING METHOD, INK CARTRIDGE, RECORDING UNIT, AND INK JET RECORDING APPARATUS

This application is a continuation of International Application No. PCT/JP2005/012708 filed on Jul. 4, 2005, which claims the benefit of Japanese Patent Application No. 2004-196448 filed on Jul. 2, 2004, and No. 2005-192194 filed on Jun. 30, 2005.

BACKGROUND OF THE INVENTION

1. Field of the Invention

This invention relates to an ink jet black ink, an ink set, an ink jet recording method, an ink cartridge, a recoding unit, and an ink jet recording apparatus.

2. Related Background Art

The ink jet recording method is a recording method of applying a small ink droplet by a working principle of various types to any one of recording medium such as paper to record images, letters or characters and so forth. Also, the ink jet recording method has characteristic features that high-speed, low-noise and multi-color printing is performable with ease, recorded patterns can enjoy a great versatility, and also development and fixing are unnecessary. Accordingly, in recent years, as a recording apparatus which forms a variety of images, such a method has rapidly come into wide use in various uses including information equipment. Moreover, images formed by a multi-color ink jet recording method can also provide record which bears comparison with multi-color print formed by a graphic method and prints formed by a color photographic method. When printed on a small number of sheets, such images are more inexpensive than usual multi-color print or photographic prints. For these reasons, the ink jet recording method is being widely applied up to a field of full-color image recording.

In recent years, as recording mediums for ink jet recording, recording mediums are also used in which a porous material such as alumina or silica is used as an ink receiving material in order to achieve image quality comparable to, or higher than, that of silver halide photographs. In particular, a recording medium making use of an alumina hydrate can promise good fixing of coloring materials having negative electric charges in ink, because the alumina hydrate has positive electric charges, and can provide well color developed images. Thus, such a recording medium has an advantage such that it is more preferable than conventional recording mediums in terms of image quality and glossiness especially in full-color images.

Inks used in the ink jet recording method are required to have reliability such as ink jet suitability, and besides, to provide recorded images with a sufficient optical density, to have good drying characteristics, to cause no blur in recorded images, to cause no flow-out of recorded images even when come into contact water, alcohol or the like, to make recorded images have a good weatherability, and so forth. In particular, it is very strongly required that recorded images have a good weatherability. The weatherability is, that is to say, the image fastness that recorded images undergo no color change or discoloration due to sunlight or illumination of various types (i.e., light fastness), or that recorded images undergo no color change or discoloration against oxidative gases (such as ozone, NOx and SOx) contained in the air in trace quantities (i.e., gas resistance).

With regard to the image fastness, what has hitherto been called to account is chiefly the discoloration of images that is due to sunlight or illumination of various types (i.e., light fastness), and the problem of such discoloration has been attempted to be solved by the use of dyes having good light fastness. However, in recent years, as images are made to have higher image quality, there have increased opportunities to exhibit images in rooms. Hence, the color change or discoloration caused by oxidative gases contained in the air (or the gas resistance) has become considered to be an important problem together with the light fastness.

In recent years, as a recording medium for ink jet recording, a recording medium is also used in which an ink receiving-layer containing a pigment and a binder is formed on a base paper in order to improve sharpness of ink color, color tone reproducibility and optical density. This, however, is desired to be improved because images formed on such a recording medium may show serious color change or discoloration, in regard to the gas resistance.

Japanese Patent No. 02919615 and Japanese Patent Publication No. H08-26263 disclose a proposal to improve color tones and remedy color change or discoloration against ozone gas. However, such gas resistance is required to be more improved in the ink jet recording method in recent years that can obtain recorded images having so high image quality as to be comparable to that of silver halide photographs.

Besides the improvement in image fastness, it is also required to improve image density (optical density) in order to achieve sufficient gradation and depth of shadow area in the case when images are formed on the recording medium in which a porous material such as alumina or silica is used as an ink receiving material.

Japanese Patent Application Laid-Open No. 2000-290552 discloses a proposal to use an ink containing specific two types of dyes, in order to improve image density. Japanese Patent Application Laid-Open No. 2000-318300 also discloses a proposal in which a treating agent containing a polymeric substance is applied to a recording medium and thereafter an ink containing a coloring material is made to adhere to the recording medium to thereby cause the coloring material to aggregate so that the image density can be improved. Japanese Patent Application Laid-Open No. 2002-275380 and No. 2003-292808 further disclose a proposal to improve image density by using a novel disazo or trisazo dye.

SUMMARY OF THE INVENTION

With a demand for higher durability and higher image quality in recent years, studies are made on an ink having a more sufficient image fastness and also promising a higher optical density.

Accordingly, the present inventors have made extensive studies and, as the result of such studies, have discovered that a compound represented by the following general formula (I) has a sufficient image fastness and also promise a relatively superior optical density.

However, the compound represented by the following general formula (I) may have an insufficient sticking resistance of nozzles of a recording head, depending on how it is used. Also, the compound represented by the following general formula (I), though promising a relatively superior optical density, should be made to achieve a higher optical density.

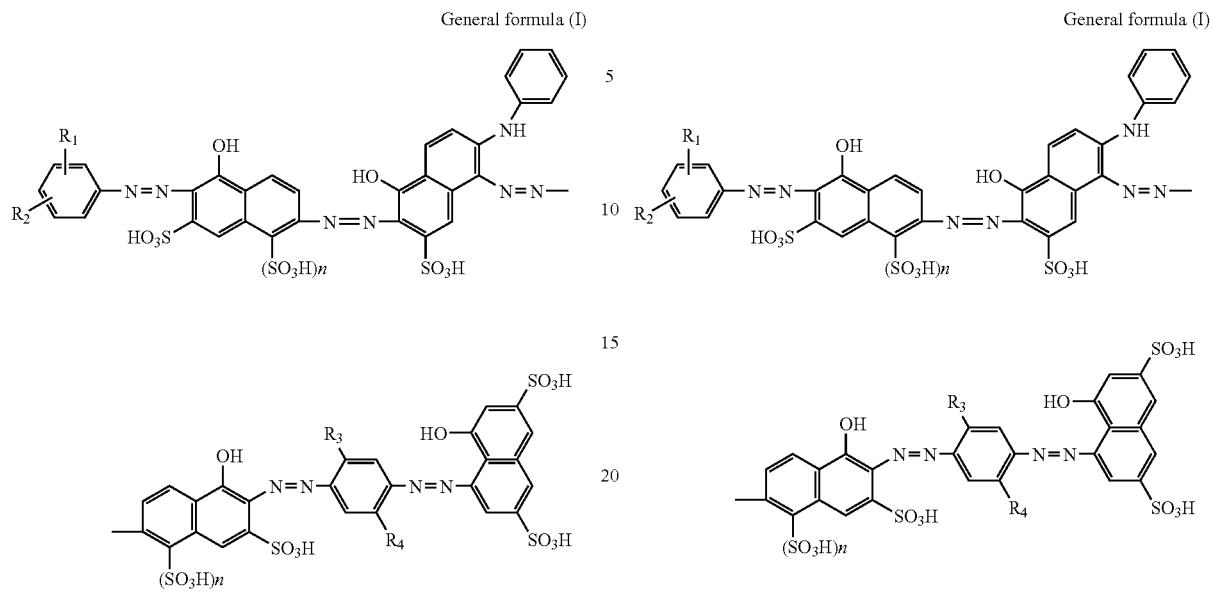

(In the general formula (I), $R_1$ and $R_2$ each independently represent a hydrogen atom, a hydroxyl group, an amino-group, a carboxyl group, a sulfonic group, an alkyl group having 1 to 4 carbon atoms or an alkoxyl group having 1 to 4 carbon atoms; and $R_3$ and $R_4$ each independently represent a hydrogen atom, an alkyl group having 1 to 4 carbon atoms, an alkoxyl group having 1 to 4 carbon atoms, a hydroxyl group, an alkyl group having 1 to 4 carbon atoms which may be substituted with a hydroxyl group or with an alkoxyl group having 1 to 4 carbon atoms, an alkoxyl group having 1 to 4 carbon atoms which may be substituted with a hydroxyl group, with an alkoxyl group having 1 to 4 carbon atoms, with a sulfonic group or with a carboxyl group, or an amino group which is substituted with an alkyl group or with an acyl group; and n represents 0 or 1.)

Therefore, an object of the present invention is to provide an ink jet black ink which can improve weatherability, optical density and sticking resistance of nozzles of a recording head.

Other objects of the pre sent invention are to provide an ink set, a ink jet recording method, a recording unit, an ink cartridge, and an ink jet recording apparatus each using the ink jet black ink.

The above objects are achieved by the invention described below. That is, according to one aspect of the present invention, an ink jet black ink comprising at least a coloring material and a water-soluble organic solvent, wherein the coloring material comprises a compound represented by the following general formula (I) or a salt thereof, and in which the water-soluble organic solvent is a water-soluble organic solvent-having a relative permittivity of from 30.0 or more to less than 70.0 at 20° C. and capable of dissolving the compound represented by the following general formula (I) or a salt thereof, by 1.0 mass % or more at 25° C., and is in a content of 50.0 mass % or more with respect to the total content of all water-soluble organic solvents contained in the ink jet black ink:

wherein $R_1$ and $R_2$ each independently represent a hydrogen atom, a hydroxyl group, an amino group, a carboxyl group, a sulfonic group, an alkyl group having 1 to 4 carbon atoms or an alkoxyl group having 1 to 4 carbon atoms; and $R_3$ and $R_4$ each independently represent a hydrogen atom, an alkyl group having 1 to 4 carbon atoms, an alkoxyl group having 1 to 4 carbon atoms, a hydroxyl group, an alkyl group having 1 to 4 carbon atoms which may be substituted with a hydroxyl group or with an alkoxyl group having 1 to 4 carbon atoms, an alkoxyl group having 1 to 4 carbon atoms which may be substituted with a hydroxyl group, with an alkoxyl group having 1 to 4 carbon atoms, with a sulfonic group or with a carboxyl group, or an amino group which is substituted with an alkyl group or with an acyl group; and n represents 0 or 1.

According to another aspect of the present invention, there is provided an ink set comprising a plurality of inks, which comprises the ink jet black ink having the above constitution as a black ink.

According to another aspect of the present invention, there is provided an ink jet recording method comprising ejecting an ink by ink jet method, wherein the ink comprises the ink jet black ink having the above constitution.

According to another aspect of the present invention, there is provided an ink cartridge comprising an ink storage portion for storing the ink, in which the ink comprises the ink jet black ink having the above constitution.

According to another aspect of the present invention, there is provided a recording unit comprising an ink storage portion for storing the ink and a recording head for ejecting the ink, in which the ink comprises the ink jet black-ink having the above constitution.

According to another aspect of the present invention, there is provided an ink jet recording apparatus comprising an ink storage portion for storing the ink and a recording head for ejecting the ink, in which the ink comprises the ink jet black ink having the above constitution.

According to the present invention, it can provide an ink which has a sufficient weatherability and can form images or dots having a high optical density, and more preferably an ink jet black ink also having a superior sticking resistance of nozzles of a recording head. The use of such an ink can further provide recorded images having a superior weatherability and recorded images having a high print density.

DESCRIPTION OF THE PREFERRED EMBODIMENTS

Figure 1:
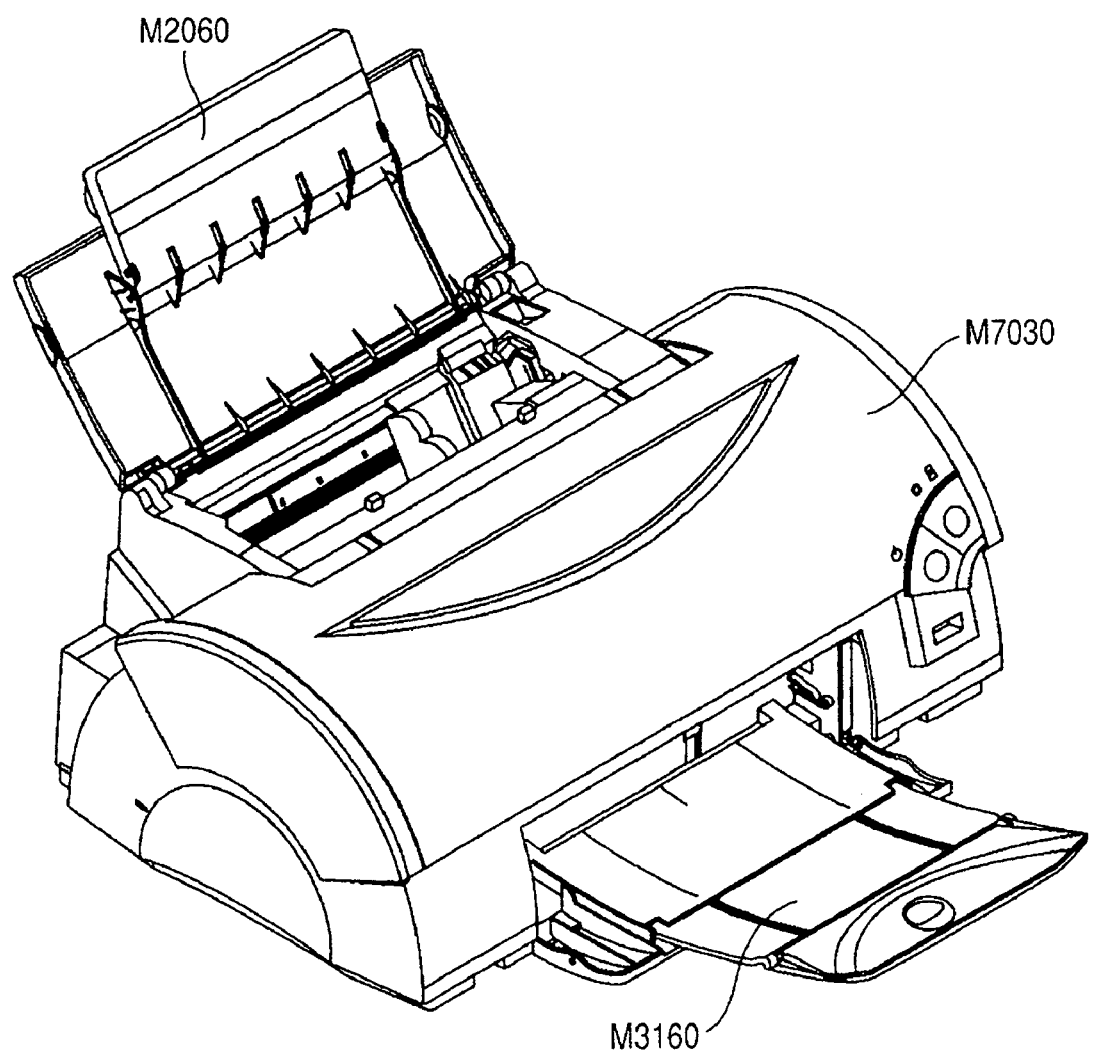
FIG. 1 is a perspective view of a recording apparatus.

Hereinafter, the present invention will be described in more detail by way of preferred embodiments.

In the present invention, when a coloring material is a salt, the salt is dissociated into ions in ink, but this state is represented by using the phrase "contains a salt" for convenience.

As to the reason why the use of an ink jet black ink (hereinafter also simply "ink") which contains the compound represented by the general formula (I) or a salt thereof and further contains a specific water-soluble organic solvent in a specific compositional proportion, the present inventors presume it as stated below.

The coloring material contained in an ink having been ejected out of a recording head comes adsorbed to a recording medium after the ink has applied to the recording medium. In particular, where images are formed on a recording medium having as an ink receiving material a porous material having cationic electric charges, using an ink containing a coloring material having anionic electric charges, it is presumed that the following phenomenon has come about. After the ink has applied to the recording medium, the coloring material having anionic electric charges which is contained in the ink having been ejected out of a recording head raises a strong adsorption on the porous material having cationic electric charges. As the result, the coloring material and aqueous medium contained in the ink causes a certain type of solid-liquid separation. More specifically, the coloring material is fixed to the surface layer portion, and the vicinity thereof, of an ink receiving layer. On the other hand, the aqueous medium having little standing charged becomes permeated into the recording medium in its depth direction.

Now, in order to obtain images having a high optical density, the following three points are important.

(1) The coloring material has a high molar absorptivity.

(2) In order to improve light transmittance, the material that forms an ink receiving layer of the recording medium is unlimitedly transparent to visible light.

(3) The coloring material density is made higher in the ink receiving layer of the recording medium.

That is, if the coloring material can be fixed to the surface layer portion and the vicinity thereof as far as possible, of the ink receiving layer after the ink has applied to the recording medium, the coloring material density can be made higher while avoiding any influence due to the haze of a material that forms the ink receiving layer. Hence, this enables achievement of a high optical density.

Accordingly, the present inventors have made studies on various water-soluble organic solvents usually used in ink jet inks, and on the relationship between each water-soluble organic solvent contained in an ink and the extent to which the coloring material contained in the ink is permeated into the recording medium in its depth direction (i.e., the depth of permeation). As the results, it has turned out that an ink containing a water-soluble organic solvent having a high relative permittivity is smaller in the extent to which the coloring material contained in the ink is permeated into the recording medium in its depth direction (i.e., the depth of permeation) than an ink containing a water-soluble organic solvent having a low relative permittivity.

As to the reason why the above phenomenon comes about, the present inventors presume it as stated below. The water-soluble organic solvent having a high relative permittivity is polarizable at a high rate, and hence, when the water-soluble organic solvent is permeated into the ink receiving layer of the recording medium, it does not shield the cationic electric charges present at the surface of porous material. Therefore, the cationicity of the porous material does not lower so much. As the result, the coloring material and aqueous medium contained in the ink having applied to the recording medium raise the solid-liquid separation immediately, so that the coloring material can be fixed to the vicinity of the surface of the recording medium.

The present inventors have further made detailed studies on the extent to which the coloring material contained in the ink is permeated into the recording medium in its depth direction (i.e., the depth of permeation) and on the relative permittivity of the water-soluble organic solvent contained in the ink. As the result, it has turned out that the use of a water-soluble organic solvent having a relative permittivity of from 30.0 or more to less than 70.0 enables the coloring material to be effectively fixed to the vicinity of the surface of the recording medium.

In particular, it has turned out that the above effect is remarkably brought out where the coloring material contained in the ink is the compound represented by the general formula (I) or a salt thereof. The reason therefor is presumed as follows. The compound represented by the general formula (I) or a salt thereof not only has a higher molar absorptivity than coloring materials used in conventional ink jet inks, but also has a large molecular weight in itself and hence it moves between porous materials at a low velocity.

That is, because of the use of such a water-soluble organic solvent having a relative permittivity of from 30.0 or more to less than 70.0, the two effects, i.e., the effect of maintaining the cationicity of the porous material and the effect that the compound represented by the general formula (I) or a salt thereof has so large a molecular weight as to move between porous bodies at a low velocity, act cooperatively to enable the coloring material to be fixed to the vicinity of the surface of the recording medium, so that a high optical density can be achieved.

Moreover, the compound represented by the general formula (I) or a salt thereof also has a very good weatherability, and hence the constitution of the present invention enables achievement of both a high optical density and a high fastness.

(Coloring Material)

The coloring material used in the present invention is the compound represented by the following general formula (I) or a salt thereof. This coloring material has a superior weatherability. In particular, the use of this coloring material in the ink having the constitution of the present invention enables achievement of the high weatherability and high optical density as aimed in the present invention.

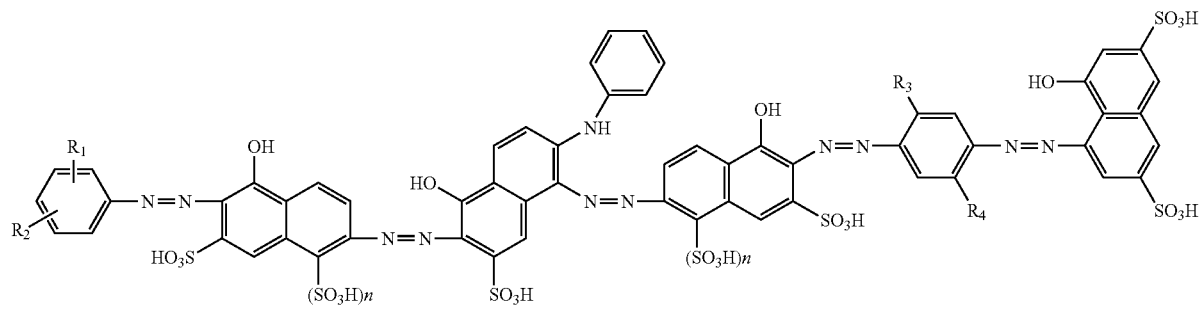

General formula (I)

(In the general formula (I), $R_1$ and $R_2$ each independently represent a hydrogen atom, a hydroxyl group, an amino group, a carboxyl group, a sulfonic group, an alkyl group having 1 to 4 carbon atoms or an alkoxyl group having 1 to 4 carbon atoms; and $R_3$ and $R_4$ each independently represent a hydrogen atom, an alkyl group having 1 to 4 carbon atoms, an alkoxyl group having 1 to 4 carbon atoms, a hydroxyl group, an alkyl group having 1 to 4 carbon atoms which may be substituted with a hydroxyl group or with an alkoxyl group having 1 to 4 carbon atoms, an alkoxyl group having 1 to 4 carbon atoms which may be substituted with a hydroxyl group, with an alkoxyl group having 1 to 4 carbon atoms, with a sulfonic group or with a carboxyl group, or an amino group which is substituted with an alkyl group or with an acyl group; and n represents 0 or 1.)

Exemplified Compounds 1 to 3 are shown below as specific examples of the compound represented by the general formula (I) or a salt thereof. Of course, the coloring material used in the present invention is by no means limited to these. Also, two or more types may be used in combination as the coloring material. Incidentally, in the general formula (I), a case in which n is 0 shows that the position of $SO_3H$ is H, as in the following Exemplified Compound 2.

Exemplified compound 1

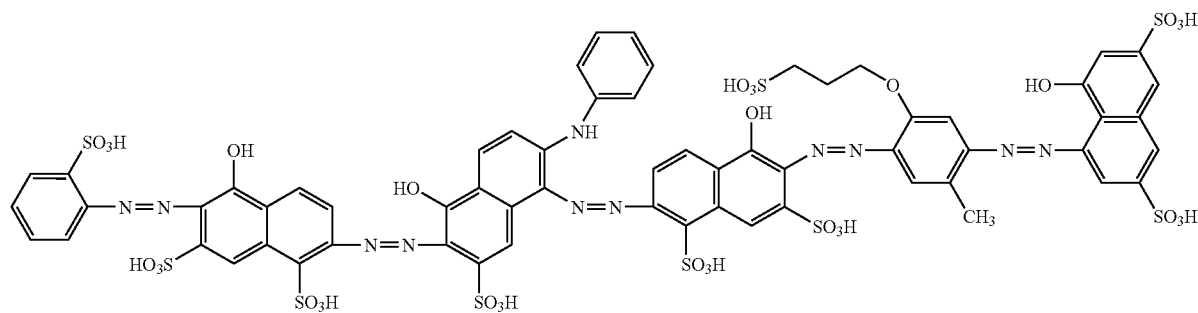

Exemplified compound 2

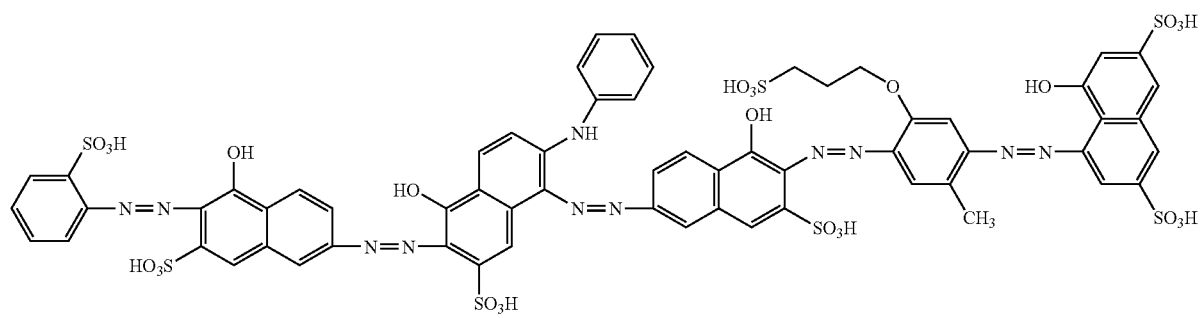

-continued

Exemplified compound 3

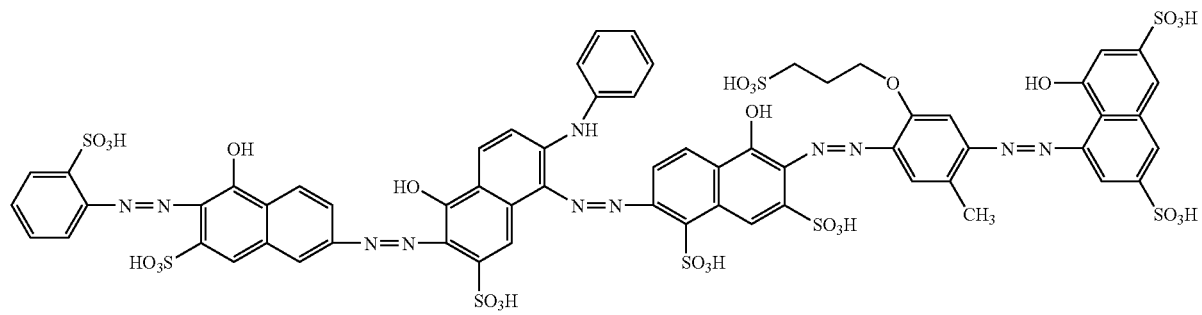

The lower limit of the content (mass %) of the compound represented by the general formula (I) or salt thereof, in the ink according to the present invention is preferably 0.1 mass % or more and more preferably 1.0 mass % or more with respect to the total mass of the ink. This is because, if the lower limit of its content is less than 0.1 mass %, the high optical density and the high weatherability which are the effects to be brought by the present invention may insufficiently be achievable. Also, the upper limit of the content (mass %) of the compound represented by the general formula (I) or a salt thereof is preferably 15.0 mass % or less and more preferably 7.0 mass % or less with respect to the total mass of the ink. This is because, if the upper limit of its content is more than 15.0 mass %, the compound represented by the general formula (I) or a salt thereof may aggregate on the recording medium to cause a phenomenon in which a metallic gloss comes about (i.e., bronzing).

(Method of Testing Dye)

Coloring material used in the present invention can be tested by the following methods (1) to (3) each of which involves the use of high performance liquid chromatography (HPLC).

(1) Retention time of the peak
(2) Maximum absorption wavelength in the peak of (1)
(3) M/Z (posi, nega) of mass spectrum in the peak of (1)

Analysis conditions for high performance liquid chromatography are shown below. An ink solution diluted 1,000 times with pure water is analyzed by means of high performance liquid chromatography under the following conditions to measure the retention time of a main peak and the maximum absorption wavelength of a peak.

Column: Symmetry C18 2.1 mm×150 mm
Column temperature: 40° C.
Flow rate: 0.2 ml/min
PDA: 210 nm to 700 nm
Mobile phase and gradient condition: Table 1

TABLE 1

|  | 0–5 min | 5–40 min | 40–45 min |
|---|---|---|---|
| A Water | 85% | 85% → 0% | 0% |
| B Methanol | 10% | 10% → 95% | 95% |
| C 0.2 mol/l aqueous ammonium acetate | 5% | 5% | 5% |

In addition, analysis conditions for a mass spectrum are as shown below. The mass spectrum of the resultant peak is measured under the following conditions, and the M/Z detected most strongly is measured for each of positive and negative.

| Ionization method | |
|---|---|
| ESI Capillary voltage | 3.5 kv. |
| Desolvating gas | 300° C. |
| Ion source temperature | 120° C. |
| Detector | |
| posi | 40 V 200–1500 amu/0.9 sec |
| nega | 40 V 200–1500 amu/0.9 sec |

Table 2 shows the values of retention time, maximum absorption wavelength, M/Z (posi), and M/Z (nega) of Exemplified Compounds 1. When a compound has the values shown in table 2, the compound can be determined to be the compound to be used in the present invention.

TABLE 2

| Retention time [min] | Maximum absorption wavelength [nm] | M/Z (Posi) | M/Z (Posi) |
|---|---|---|---|
| 25–27 | 565–585 | 833–834 | 554–555 |

(Other Coloring Material(s))

In the present invention, in addition to the above compound, a coloring material other than the foregoing may also be used as a coloring material for color conditioning.

In order to form full-color images or the like, inks having color tones different from the ink of the present invention may be used in combination. For example, they are a cyan ink, a magenta ink, a yellow ink and so forth. Also, light-color inks having the same color tones as these inks may be used in combination. Coloring materials of these inks having different color tones or light-color inks may be known coloring materials, or coloring materials synthesized newly, any of which may be used.

Specific examples of the coloring material for color conditioning and the coloring materials usable in other inks used together with the black ink of the present invention are shown below according to color tones. Of course, examples are by no means limited to these.

[Magenta Coloring Material]

C.I. Direct Red 2, 4, 9, 11, 20, 23, 24, 31, 39, 46, 62, 75, 79, 80, 83, 89, 95, 197, 201, 218, 220, 224, 225, 226, 227, 228, 229, 230, etc.;

C.I. Acid Red 6, 8, 9, 13, 14, 18, 26, 27, 32, 35, 42, 51, 52, 80, 83, 87, 89, 92, 106, 114, 115, 133, 134, 145, 158, 198, 249, 265, 289, etc.;

C.I. Food Red 87, 92, 94, etc.; and

C.I. Direct Violet 107, etc.

[Cyan Coloring Material]

C.I. Direct Blue 1, 15, 22, 25, 41, 76, 77, 80, 86, 90, 98, 106, 108, 120, 158, 163, 168, 199, 226, 307, etc.; and C.I. Acid Blue 1, 7, 9, 15, 22, 23, 25, 29, 40, 43, 59, 62, 74, 78, 80, 90, 100, 102, 104, 112, 117, 127, 138, 158, 161, 203, 204, 221, 244, etc.

[Yellow Coloring Material]

C.I. Direct Yellow 8, 11, 12, 27, 28, 33, 39, 44, 50, 58, 85, 86, 87, 88, 89, 98, 100, 110, 132, 173, etc.; and C.I. Acid Yellow 1, 3, 7, 11, 17, 23, 25, 29, 36, 38, 40, 42, 44, 76, 98, 99, etc.

[Black Coloring Material]

C.I. Direct Black 17, 19, 22, 31, 32, 51, 62, 71, 74, 112, 113, 154, 168, 195, etc.;

C.I. Acid Black 2, 48, 51, 52, 110, 115, 156, etc.;

C. I. Food Black 1, 2, etc., etc;

a dye represented by the following general formula (II):

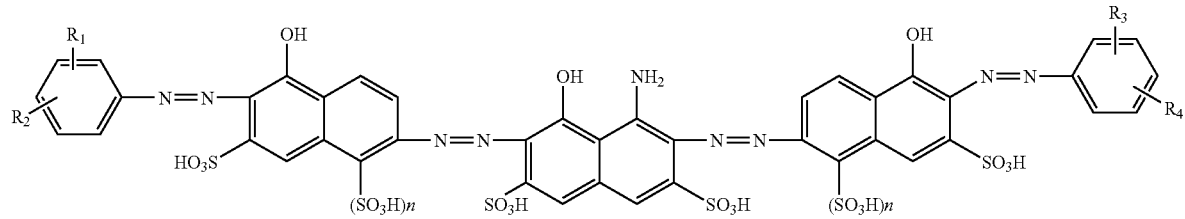

General formula (II)

(In the general formula (II), $R_1$, $R_2$, $R_3$ and $R_4$ represent each independently a hydrogen atom, a hydroxyl group, an amino group, a carboxyl group, a sulfonic group, an alkyl group-having 1 to 4 carbon atoms, an alkoxyl group having 1 to 4 carbon atoms, an alkoxyl group which is substituted with a hydroxyl group, with an alkoxyl group having 1 to 4 carbon atoms, with a sulfonic group or with a carboxyl group, an alkoxyl group having 1 to 4 carbon atoms which may further be substituted with a carboxyl group or with a sulfonic group, or an amino group which is substituted with a phenyl group, with an alkyl group or with an acyl group; and n represents 0 or 1. Incidentally, in the general formula (II), a case in which n is 0 shows that the position of $SO_3H$ is H, as in the compound represented by the general formula (I) or a salt thereof.); and a condensation dye of a compound represented by the following general formula (III) and a compound represented by the following general formula (IV):

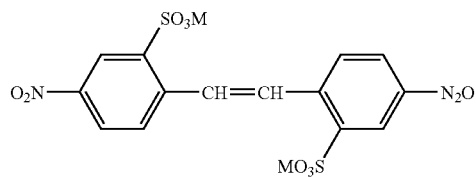

General formula (III)

(In the general formula (III), M represents a hydrogen atom or an alkali metal atom.)

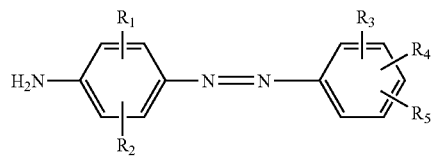

General formula (IV)

(In the general formula (IV), $R_1$, $R_2$, $R_3$, $R_4$ and $R_5$ represent each independently a hydrogen atom, a halogen atom, a hydroxyl group, a sulfonic group, a carboxyl group, an alkyl group having 1 to 4 carbon atoms, or an alkoxyl group having 1 to 4 carbon atoms).

(Aqueous Medium)

[Water-Soluble Organic Solvent Having a Relative Permittivity of from 30.0 or More to Less than 70.0 at 20° C. and Capable of Dissolving the Compound Represented by the General Formula (I) or a Salt Thereof by 1.0 Mass % or More at 25° C.]

There are no particular limitations on the water soluble organic solvent-having a relative permittivity of from 30.0 or more to less than 70.0 at 20° C. and capable of dissolving the compound represented by the general formula (I) or a salt thereof by 1.0 mass % or more at 25° C., as long as it shows the relative permittivity within the above range and the above solubility for the above compound or a salt thereof. Specific examples of the water-soluble organic solvent having a relative permittivity of from 30.0 or more to less than 70.0 at 20° C. and capable of dissolving the compound represented by the general formula (I) or a salt thereof by 1.0 mass % or more at 25° C. may include glycerol, ethylene glycol, diethylene glycol, 1,2-propanediol, 1,3-propanediol and 1,4-butanediol. Of these, glycerol and ethylene glycol are particularly preferred. This is because these water-soluble organic solvents make the ink have good ejection performance when used in the ink jet ink in combination with the compound represented by the general formula (I) or a salt thereof.

In the present invention, it is essential that the water-soluble organic solvent having a relative permittivity of from 30.0 or more to less than 70.0 at 20° C. and capable of dissolving the compound represented by the general formula (I) or a salt thereof by 1.0 mass % or more at 25° C. is in a content of 50.0 mass % or more with respect to the total content of all water-soluble organic solvents contained in the ink. If its content is in a proportion of less than 50.0 mass %, the recorded images may have a lower optical density than the case in which its content is in a proportion of 50.0 mass % or more, so that the effect of the present invention may be insufficiently obtainable. Also, all the water-soluble organic solvents contained in the ink may be water-soluble organic solvents each having a relative permittivity of from 30.0 or more to less than 70.0 at 20° C. and capable of dissolving the compound represented by the general formula (I) or a salt thereof by 1.0 mass % or more at 25° C.

The reason why the water-soluble organic solvent having a relative permittivity of from 30.0 or more to less than 70.0 at 20° C. as used in the present invention must be capable of dissolving the compound represented by the general formula (I) or a salt thereof by 1.0 mass % or more at 25° C. is that sticking recovery property in nozzles of a recording head is to be improved. That is, the sticking recovery property in a high-temperature or low-humidity environment lowers as the content of the water-soluble organic solvent capable of dissolving the compound represented by the general formula (I) or a salt thereof by 1.0 mass % or more at 25° C. comes below 50.0% with respect to the total content of all water-soluble organic solvents contained in the ink.

Incidentally, the solubility (degree of solubility) of the coloring material was measured in the following way. 50 g of an aqueous solution in which the coloring material stood dissolved was put into a 100 ml beaker (JIS R 3503), and this was left in a thermostatic chamber kept at a temperature of 60° C. and a humidity of 20%, followed by evaporation to dryness until changes in mass per 3 hours came to 0.01 gram or less. Then, the substance thus obtained was ground down with a mortar to obtain a powder. This powder was dissolved in the intended water-soluble organic solvent at 25° C. until the solution came into saturation. The mass of the coloring material required for bringing the solution into saturation was divided by the total mass of the water-soluble organic solvent and coloring material, and the value thus obtained was regarded as the solubility (degree of solubility). Incidentally, where the coloring material is originally in the state of powder, it was dissolved in the intended water-soluble organic solvent at 25° C. until the solution came into saturation, and the mass of the coloring material required for bringing the solution into saturation was divided by the total mass of the water-soluble organic solvent and coloring material, and the value thus obtained was regarded as the solubility (degree of solubility).

[Other Water Soluble Organic Solvent(s) and Water]

In the ink of the present invention, in addition to the above water-soluble organic solvent having a relative permittivity of from 30.0 or more to less than 70.0 at 20° C. and capable of dissolving the compound represented by the general formula (I) or a salt thereof by 1.0 mass % or more at 25° C., water or a mixed solvent of water and a water-soluble organic solvent(s) of various types may be used as long as the effect to be brought by the addition of these is obtainable and also the effect aimed in the present invention is not damaged.

There are no particular limitations on the water-soluble organic solvent(s) as long as it is soluble in water, and usable are alkyl alcohols having 1 to 5 carbon atoms such as methyl alcohol, ethyl alcohol, n-propyl alcohol, isopropyl alcohol, n-butyl alcohol, sec-butyl alcohol, tert-butyl alcohol, isobutyl alcohol and n-pentanol; amides such as dimethylformamide and dimethylacetamide; ketones or ketoalcohols such as acetone and diacetone alcohol; ethers such as tetrahydrofuran and dioxane; oxyehtylene or oxyprolylene copolymers such as triethylene glycol, tetraethylene glycol, dipropylene glycol, tripropylene glycol, polyethylene glycol and polypropylene glycol; alkylene glycols such as trimethylene glycol, triethylene glycol and 1,2,6-hexanetriol; lower alkyl ethers such as ethylene glycol monomethyl (or ethyl) ether, diethylene glycol monomethyl (or -ethyl) ether and triethylene glycol monomethyl (or -ethyl) ether; lower dialkyl ethers of polyhydric alcohols, such as triethylene glycol dimethyl (or -ethyl) ether and tetraethylene glycol dimethyl (or -ethyl) ether; alkanolamines such as monoethanolamine, diethanolamine and triethanolamine; and sulfolane, N-methyl-2-pyrrolidone, and 2-pyrrolidone. Any of the above water-soluble organic solvents may be used alone, or may be used in the form of a mixture.

Any of these water-soluble organic solvents and the above water-soluble organic solvent having a relative permittivity of from 30.0 or more to less than 70.0 at 20° C. and capable of dissolving the compound represented by the general formula (I) or a salt thereof by 1.0 mass % or more at 25° C. may be in a content of from 10 mass % to 95 mass %, and more preferably from 10 mass % to 80 mass %, in total, with respect to the total mass of the ink. If they are in a content smaller than this range, a problem may arise about the sticking recovery performance in the recording head. If they are in a content larger than this range, the ink may have so high a viscosity as to cause a problem about the continuous ejection performance of the ink.

Deionized water (ion-exchange water) is preferably used as water. The water may preferably be in a content of from 10 mass % to 90 mass % with respect to the total mass of the ink.

(Other Additives)

In the present invention, the ink may further be incorporated with various additives such as a surfactant, a pH adjuster, a rust inhibitor, an antiseptic, a mildewproofing agent, an antioxidant, a reduction-preventive agent, an evaporation accelerator, a chelating agent and a water-soluble polymer.

For example, as specific examples of the surfactant, usable are anionic surfactants such as fatty acid salts, higher alcohol sulfuric ester salts, liquid fatty oil sulfuric ester salts and alkylaryl sulfonates; and nonionic surfactants such as polyoxyethylene alkyl ethers, polyoxyethylene alkyl esters, polyoxyethylene sorbitan alkyl esters, acetylene alcohol and acetylene glycol. One or two or more of these may be used under appropriate selection. Of these, acetylene alcohols and acetylene glycol are particularly preferred because they bring out a superior effect on the penetrability into plain paper. The surfactant in the ink may preferably be in a content of from 0.01 mass % to 5 mass % with respect to the total mass of the ink.

In order to effectively keep print deviations (mis-alignment of ink-droplet impact points) from occurring because of the wetting of nozzle tips of the recording head and to afford ejection performance, the content of the surfactant may preferably be so determined that the ink may preferably have a surface tension of 10 mN/m (dyn/cm) or more at 25° C., and more preferably 20 mN/m, (dyn/cm) or more and a surface tension of 60 mN/m or less. Also, where the ink of the present invention is used in an ink jet recording apparatus, it is preferable to make control so that the ink can have the desired viscosity and pH, in order to achieve a good ejection performance.

<Recording Medium>

As the recording medium used when images are formed using the ink of the present invention, any medium may be used as long as it is a recording medium to which the ink is applied to perform recording. In particular, a recording medium is preferred in which the ink receiving layer is formed of porous fine particles having cationic electric charges. More preferred is a recording medium in which the ink receiving layer is chiefly formed of fine particles having an average particle diameter or 1 μm or less.

Such fine particles may include, as specific examples, fine aluminum oxide particles, fine alumina hydrate particles, fine cationic-modified silica particles surface-treated with aluminum, and fine silica particles obtained by allowing surface-anionic silica particle surfaces to react with a compound having a cationic group and a group (such as a trimethoxysilyl group) capable of reacting with silica particles. In particular, preferred are fine particles of an alumina hydrate represented by the following formula.

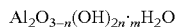

$Al_2O_{3-n}(OH)_{2n} \cdot mH_2O$

In the above formula, n represents an integer of 1, 2 or 3, and m represents a value of 0 to 10, and preferably 0 to 5, provided that m and n are not 0 at the same time. In many cases, $_mH_2O$ represents even an eliminable aqueous phase not participating in the formation of $_mH_2O$ crystal lattices, and hence m may take an integer or a value which is not an integer. Also, it is possible that m reaches the value of 0 upon heating of the material of this type.

The alumina hydrate may be produced by a known method such as hydrolysis of an aluminum alkoxide or hydrolysis of sodium aluminate as disclosed in U.S. Pat. No. 4,242,271 and U.S. Pat. No. 4,202,870, or a method in which an aqueous solution of sodium sulfate, aluminum chloride or the like is added to an aqueous solution of sodium aluminate to effect neutralization as disclosed in Japanese Patent Publication No. S57-44605.

The recording medium making use of the above alumina hydrate is preferred because the gloss, transparency, fixability of coloring material in ink, and so forth can be good which are required in order to achieve the photographic image quality as stated previously.

A binder may include, e.g., water-soluble high polymers or latexes. For example, usable are polyvinyl alcohol or modified products thereof, starch or modified products thereof, gelatin or modified products thereof, gum arabic, cellulose derivatives such as carboxymethyl cellulose, hydroxyethyl cellulose and hydroxypropyl methylcellulose, vinyl copolymer latexes such as SBR latex, NBR latex, methyl methacrylate-butadiene copolymer latex, functional group modified polymer latex and ethylene-vinyl acetate copolymer latex, polyvinyl pyrrolidone, maleic anhydride or copolymers thereof, acrylate copolymers, and so forth. Any one selected from these may be used or two or more of these may optionally be used in combination.

The fine particles and the binder may be mixed in a ratio of from 1:1 to 100:1 in mass ratio. The fine aluminum oxide particles or the fine silica particles in the ink receiving layer may preferably be in a content of 50 mass % or more, more preferably 70 mass % or more, still more preferably 80 mass % or more, and most preferably 99 mass % or less. The ink receiving layer may preferably be formed in a coating weight of 10 g/m² or more, and most preferably from 10 to 60 g/m², in terms of dry solids content.

The recording medium may preferably have a support for supporting the ink receiving layer. There are no particular limitations on the support and any support may be used, as long as the ink receiving layer can be formed of the porous fine particles and also can provide the recording medium with a rigidity that enables its transportation by a transport mechanism of an ink jet printer or the like. For example, usable is a support having a porous layer which has been formed between the support and the ink receiving layer by coating an inorganic pigment such as barium sulfate, titanium oxide or zinc oxide together with the binder. A resin-coated paper may also be used as the support.

In the ink receiving layer, other additives may also be used, which may optionally include, e.g., a dispersing agent, a thickening agent, a pH adjuster, a lubricant, a fluidity modifier, a surfactant, an anti-foaming agent, a release agent, a fluorescent brightener, an ultraviolet absorber and an antioxidant.

<Ink Set>

The ink according to the present invention can be preferably used in combination with other inks as an ink set. An ink set according to the present invention consists of the ink according to the present invention being used together with other inks such as cyan ink, magenta ink, yellow ink and black ink. It is noted that there are no particular restrictions regarding what other inks may be combined as the ink set. Further, while the term "ink set" used in the present invention obviously includes an ink tank itself integrating a plurality of ink tanks, this term also includes cases where a plurality of individual ink tanks are used in combination, as well as cases where the ink tank and a recording head are integrated.

<Ink Jet Recording Method>

The ink according to the present invention is especially preferably used for an ink jet recording method which comprises a step for ejecting ink by an ink jet method. Examples of an ink jet recording method include a recording method which ejects ink through the action of mechanical energy on the ink, and a recording method which ejects ink through the action of thermal energy on the ink. In particular, in the present invention an ink jet recording method which involving the use of thermal energy can be preferably used.

<Ink Cartridge>

Examples of a preferable ink cartridge for carrying out printing using the ink according to the present invention include an ink cartridge which comprises an ink storage portion for storing the ink.

<Recording Unit>

Examples of a preferable recording unit for carrying out recording using the ink according to the present invention include a recording unit which comprises an ink storage portion for storing such ink and a recording head. In particular, such examples include a recording unit in which the above-described recording head causes thermal energy responding to a recording signal to act upon the ink, to thereby generate an ink droplet using this energy.

<Ink Jet Recording Apparatus>

An example of a recording apparatus suitable for performing recording by using the ink according to the present invention includes a recording apparatus in which thermal energy corresponding to a recording signal is applied to ink in the chamber of a recording head having an ink storage portion for storing the ink to generate an ink droplet by virtue of the energy.

The schematic constitution of a mechanism portion of an ink jet recording apparatus will be described below. A recording apparatus main body is constituted of a sheet feeding portion, a sheet conveying portion, a carriage portion, a sheet discharge portion, and a cleaning portion, and an external packaging portion for protecting them and providing them with a design, each of which plays a role of each mechanism. The outline of each of them will be described below.

Figure 2:
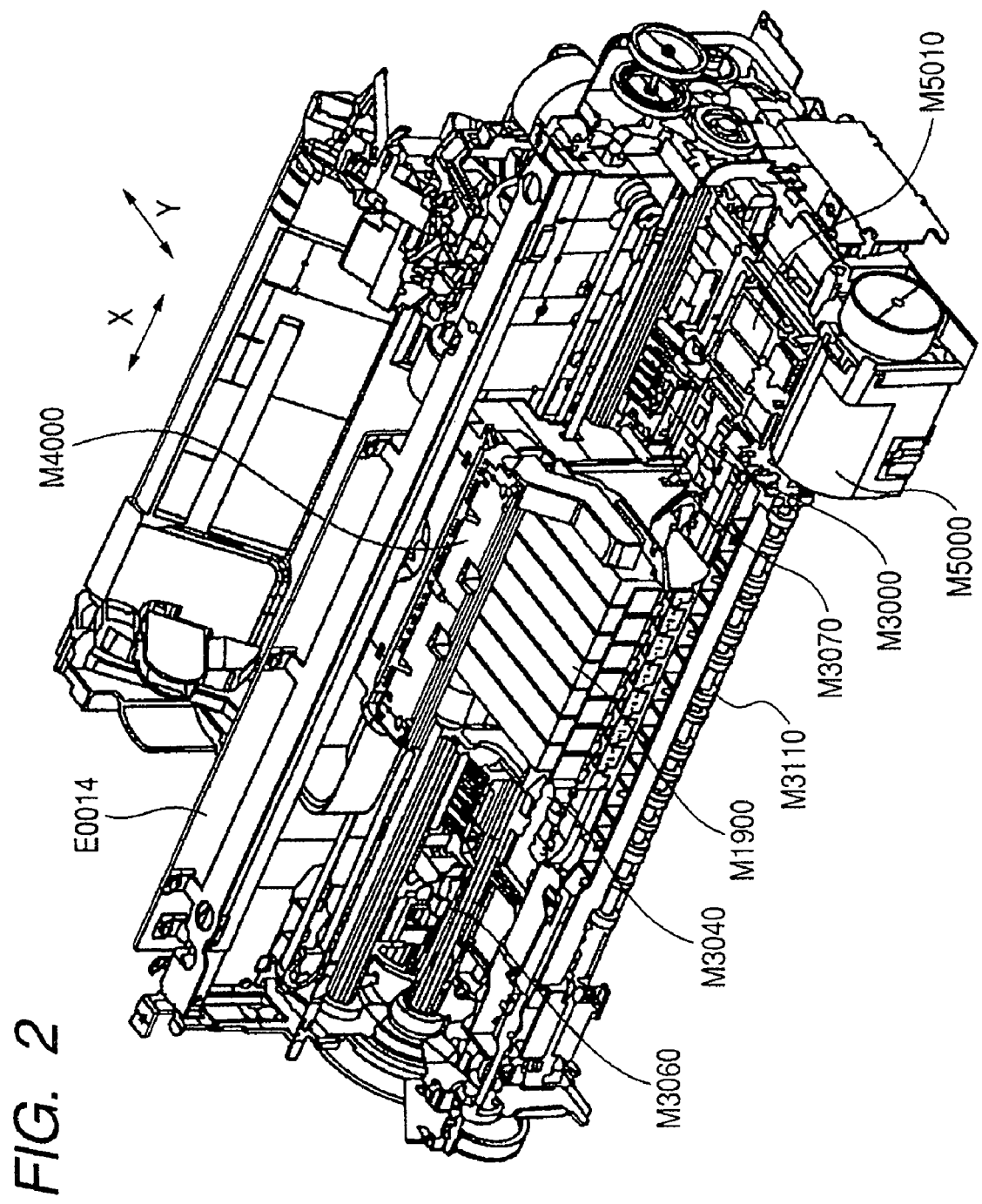
FIG. 2 is a perspective view of a mechanism portion of the recording apparatus.
Figure 3:
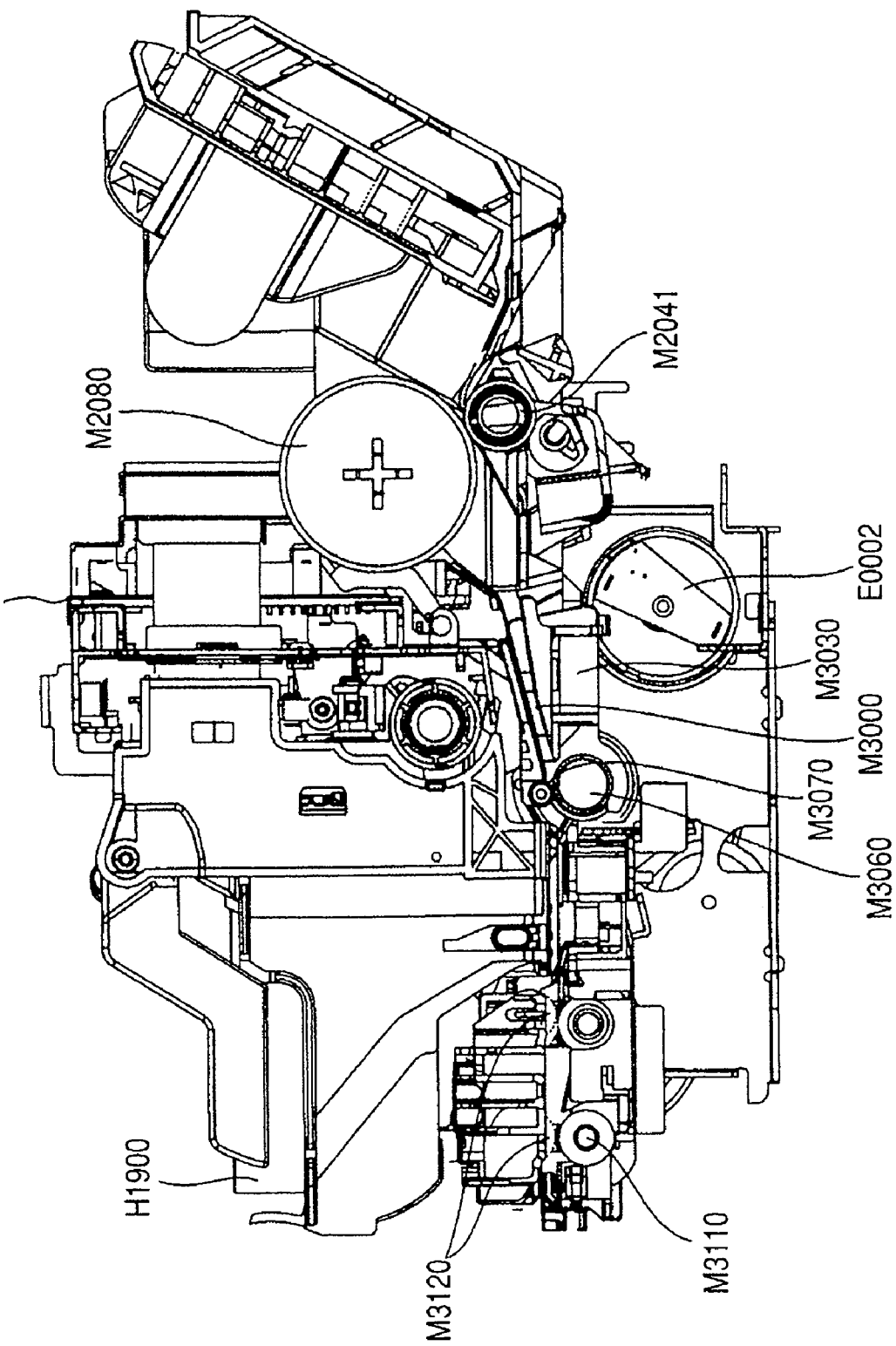
FIG. 3 is a sectional view of the recording apparatus.

FIG. 1 is a perspective-view of a recording apparatus. FIGS. 2 and 3 are views for explaining the internal mechanism of a recording apparatus main body. FIG. 2 is a perspective view seen from an upper right portion, and FIG. 3 is a side sectional view of the recording apparatus main body.

When sheets are fed in the recording apparatus, only the predetermined number of recording media are sent to a nip portion composed of a sheet feeding roller M2080 and a separating roller M2041 in the sheet feeding portion including a sheet feeding tray M2060. The sent recording media are separated at the nip portion, and only the uppermost recording medium is conveyed. The recording medium sent to the sheet conveying portion is guided by a pinch roller holder M3000 and a paper guide flapper M3030 to be sent to a roller pair composed of a conveying roller M3060 and a pinch roller M3070. The roller pair composed of the conveying roller M3060 and the pinch roller M3070 are driven and rotated by an LF motor E0002, whereby the recording medium is conveyed through a platen M3040.

In the carriage portion, when an image is formed on a recording medium, a recording head H1001 (FIG. 4) is arranged at a target image forming position, and ink is ejected to the recording medium in accordance with a signal from an electrical substrate E0014. Details about the constitution of the recording head H1001 will be described later. While recording is performed by the recording head H1001, recording main scanning in which a carriage M4000 scans in the column direction and sub scanning in which a recording medium is conveyed in the row direction by the conveying roller M3060 are alternately repeated, whereby an image is formed on the recording medium.

Finally, the recording medium on which an image has been formed is pinched at a nip between a first sheet discharge roller M3110 and a spur M3120 in the sheet discharge portion, conveyed, and discharged to a sheet discharge tray M3160.

In the cleaning portion, when a pump M5000 is allowed to act in such a state that a cap M5010 is brought into close contact with an ink ejection port of the recording head H1001 for the purpose of cleaning the recording head H1011 before and after image recording, unnecessary ink and the like are sucked from the recording head H1001. The ink remaining in the cap M5010 is sucked with the cap M5010 opened, whereby neither adhesion of the remaining ink nor a subsequent harmful effect occurs.

(Constitution of Recording Head)

The constitution of a head cartridge H1000 will be described below. The head cartridge H1000 includes, the recording head H1001, means for mounting ink tanks H1900, and means for supplying ink from the ink tanks H1900 to the recording head, and is detachably mounted on the carriage M4000.

Figure 4:
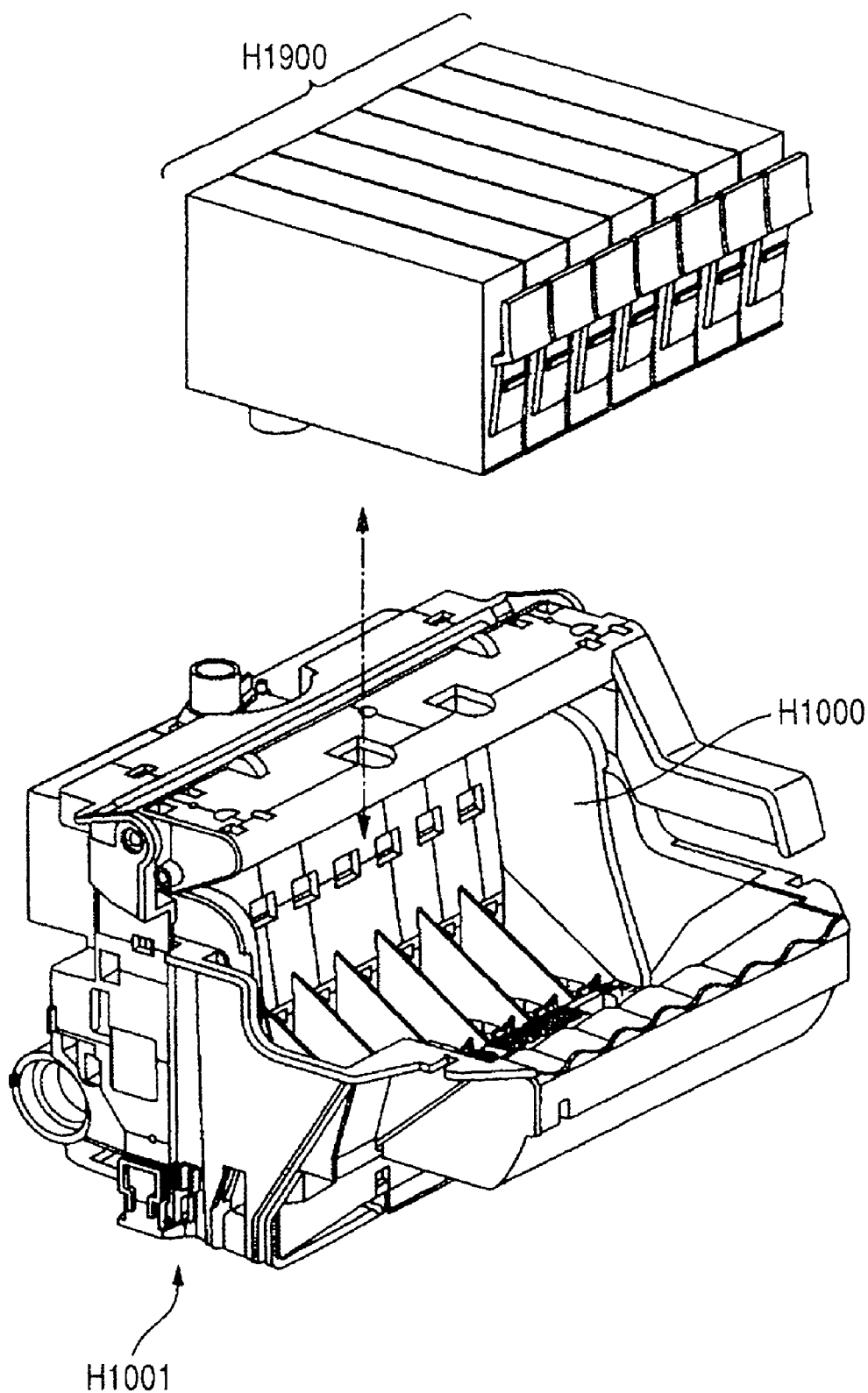
FIG. 4 is a perspective view showing a state in which an ink tank is mounted on a head cartridge.

FIG. 4 shows how the ink tanks H1900 are mounted on the head cartridge H1000. The recording apparatus forms images by means of yellow, magenta, cyan, black, pale magenta, pale cyan, and green inks, and so the ink tanks H1900 are independently prepared for seven colors. The ink according to the present invention is used for at least one of the above inks. In addition, as shown in the figure, each ink tank is detachable to the head cartridge H1000. The ink tanks H1900 can be detached in such a state that the head cartridge H1000 is mounted on the carriage M4000.

Figure 5:
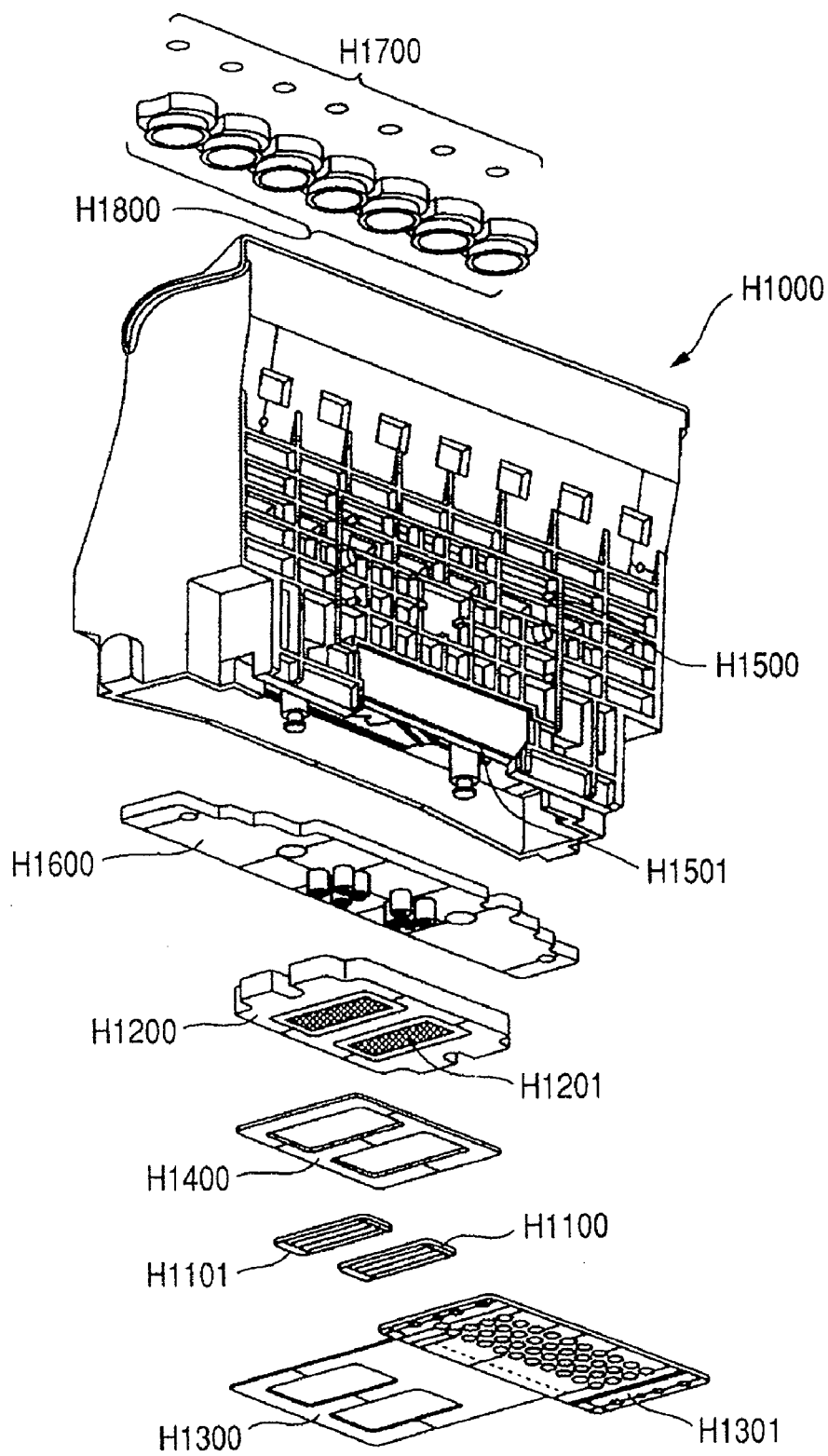
FIG. 5 is an exploded perspective view of the head cartridge.

FIG. 5 shows an exploded perspective view of the head cartridge H1000. In the figure, the head cartridge H1000 includes a first recording element substrate H1100, a second recording element substrate H1101, a first plate H1200, a second plate H1400, an electric wiring substrate H1300, a tank holder H1500, a flow path forming member H1600, a filter H1700, and a seal rubber H1800.

Each of the first recording element-substrate H1100 and the second recording element substrate H1101 is a Si substrate having multiple recording elements (nozzles) for ejecting ink formed on one side by means of photolithography. Electric wiring made of Al or the like for supplying power to each recording element is formed by means of a film formation technique, and multiple ink flow paths corresponding to the individual recording elements are also formed by means of photolithography. Furthermore, ink supply ports for supplying ink to the multiple ink flow paths are formed so as to open on the rear surface.

Figure 6:
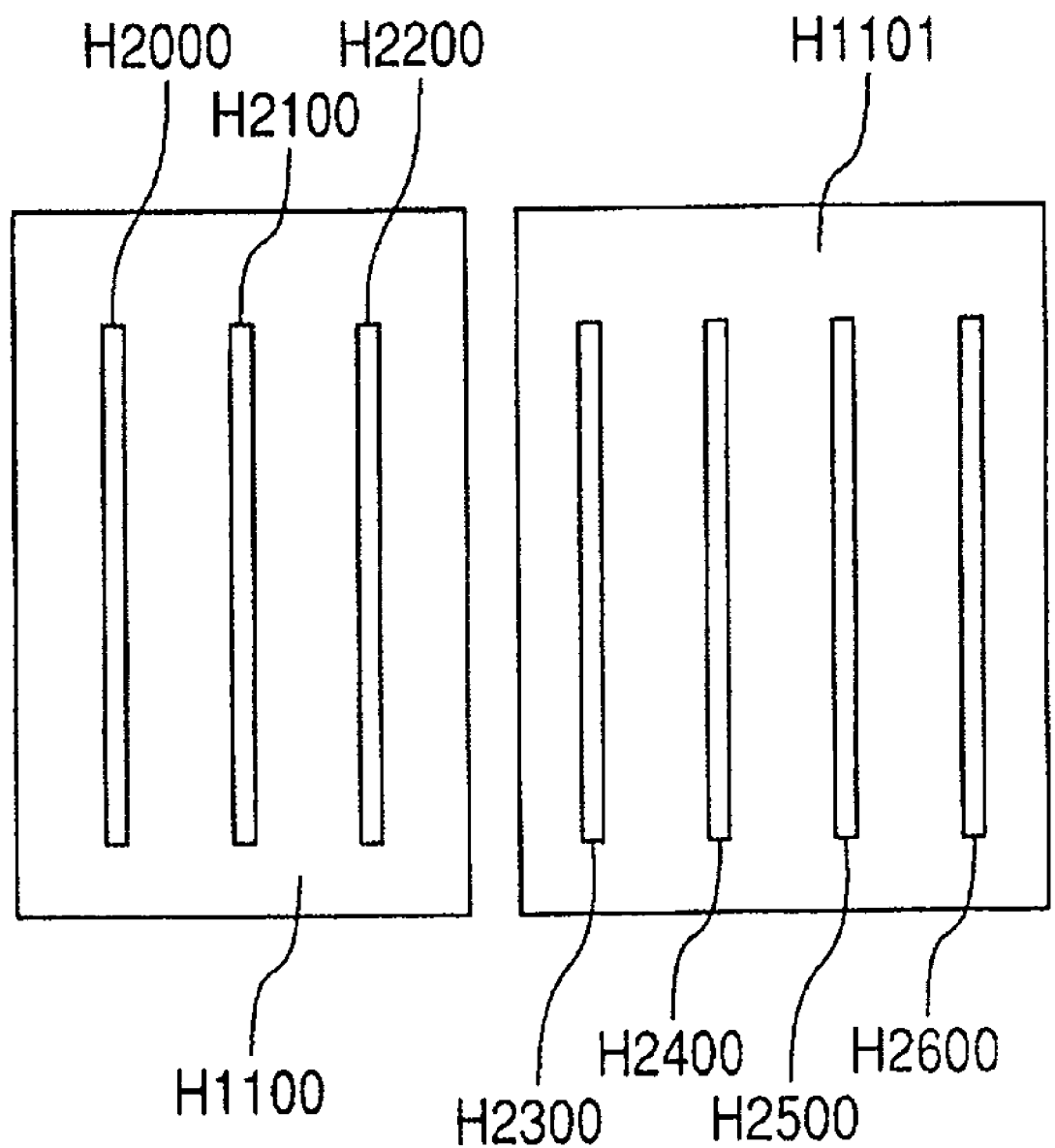
FIG. 6 is a front view showing a recording element substrate of the head cartridge.

FIG. 6 is an enlarged front view for explaining the constitution of each of the first recording element substrate H1100 and the second recording element substrate, H1101. Reference symbols H2000 to H2600 denote recording element trains (hereinafter referred to also as nozzle trains) corresponding to different ink colors. The first recording element substrate H1100 has nozzle trains for three colors: the nozzle train H2000 to which yellow ink is supplied, the nozzle train H2100 to which magenta ink is supplied, and the nozzle train H2200 to which cyan ink is supplied. The second recording element substrate H1101 has nozzle trains for four colors: the nozzle train H2300 to which pale cyan ink is supplied, the nozzle train H2400 to which black ink is supplied, the nozzle train H2500 to which orange ink is supplied, and the nozzle train H2600 to which pale magenta ink is supplied.

Each nozzle train is constituted by 768 nozzles arranged at intervals of 1,200 dpi (dot/inch; reference value) in the conveying direction of a recording medium, and each nozzle ejects about 2 pl of ink. An opening area in each nozzle ejection port is set to be about 100 $\mu m^2$. The first recording element substrate H1100 and the second recording element substrate H1101 are bonded and fixed to the first plate H1200 having ink supply ports H1201 formed thereon for supplying ink to the first recording element substrate H1100 and the second recording element substrate H1101.

The second plate H1400 having openings is also bonded and fixed to the first plate H1200. The second plate H1400 holds the electric wiring substrate H1300 in such a manner that the electric wiring substrate H1300, the first recording element substrate H1100, and the second recording element substrate H1101 are electrically connected.

The electric wiring substrate H1300 impresses electrical signals for causing each of the nozzles formed on the first recording element substrate H1100 and the second recording element substrate H1101 to eject ink. The electric wiring substrate H1300 has: electric wiring corresponding to each of the first recording element substrate H1100 and the second recording element substrate H1101; and an external signal input terminal H1301 which is positioned at the end portion of the electric wiring to receive electrical signals from the recording apparatus main body. The external signal input terminal H1301 is positioned and fixed to the back surface side of the tank holder H1500.

The flow path forming member H1600 is fixed by means of, for example, ultrasonic welding to the tank holder H1500 for holding the ink tanks H1900. Thus, an ink flow path H1501 passing from the ink tanks H1900 to the first plate H1200 is formed.

The filter H1700 is arranged at the end portion on the ink tank side of the ink flow path H1501 engaged with the ink tanks H1900, and so the filter H1700 prevents dust from entering from the outside. The seal rubber H1800 is mounted on the portion at which the ink flow path H1501 is engaged with the ink tanks H1900 to prevent ink from evaporating from the portion.

Furthermore, as described above, the head cartridge H1000 is made up by connecting a tank holder portion constituted of the tank holder H1500, the flow path forming member H1600, the filter H1700 and the seal rubber H1800, with the recording head portion H1001 constituted of the first recording element substrate H1100, the second recording element substrate H1101, the first plate H1200, the electric wiring substrate H1300 and the second plate H1400 by the use of an adhesive or the like.

Description has been made here by taking, as an example of an embodiment of a recording head, a recording head according to a bubble jet (registered trademark) method that performs recording by means of an electrothermal converter (recording element) for generating thermal energy for causing ink to generate film boiling in accordance with an electrical signal.

As for the representative structure and principle, it is preferred to use basic principles disclosed in, for example, U.S. Pat. No. 4,723,129 and U.S. Pat. No. 4,740,796. The method is applicable to any one of a so-called on-demand type and a so-called continuous type. In particular, the method is effective for the on-demand type because of the following reason. At least one driving signal which corresponds to recording information and causes a sudden increase in temperature exceeding nuclear boiling is applied to electrothermal converters arranged corresponding to a sheet or liquid flow path holding a liquid (ink), thereby causing the electrothermal converter to generate thermal energy. Then, film boiling is generated on the thermal action surface of a recording head. As a result, an air bubble in the liquid (ink) can be formed so as to be in one-to-one correspondence with the driving signal. The growth and contraction of the air bubble eject the liquid (ink) through an opening for ejection, thereby forming at least one droplet. It is more preferable that the driving signal is of a pulse shape because the growth and contraction of an air bubble can be performed immediately and appropriately, and hence the liquid (ink) can be ejected with excellent responsiveness.

As an example of a second embodiment of an ink jet recording apparatus utilizing mechanical energy, an on demand ink jet recording head may be cited, including a nozzle forming substrate having multiple nozzles; pressure generating means arranged so as to be opposite to the nozzles and composed of a piezoelectric material and a conductive material; and ink filling the surroundings of the pressure generating means, in which the pressure generating means is displaced by an applied voltage to eject a small ink droplet from a nozzle.

The ink jet recording apparatus is not limited to such apparatuses as described above in which a head and an ink tank are separated, and may be one in which a head and an ink tank are unified so that they are unseparable. The ink tank may be separably or unseparably unified with the head to be mounted on a carriage, or may be mounted at a fixing portion of an apparatus to supply ink to a recording head through an ink supply member such as a tube. When the ink tank is provided with a constitution for applying a suitable negative pressure to the recording head, an absorber may be arranged in an ink storage portion of the ink tank, or the ink tank may have a flexible ink storage bag and a spring portion for applying bias in the direction of expanding the internal volume of the bag. The recording apparatus may adopt a serial recording method as described above, or may be in the form of a line printer obtained by aligning recording elements over the range corresponding to the entire width of a recording medium.

EXAMPLES

Hereinafter, the present invention will be described in more detail by way of examples and comparative examples. However, the present invention is not limited to the following examples unless the examples depart from the gist of the present invention. Unless a otherwise specified, the term "part" of each ink component in examples and comparative examples represents "part by mass".

<Preparation of Coloring Material>

[Preparation of Compound (α)]

A compound represented by the following formula (A) was added to and dissolved in water to which sodium carbonate had been added, further followed by addition of hydrochloric acid and sodium nitrite to effect diazotization. To this diazotized turbid fluid, an aqueous solution of 6-phenylamino-1-hydroxynaphthalene-3-sulfonic acid was added, and the mixture obtained was dissolved in the presence of sodium carbonate to obtain a reaction fluid (A). Next, 2-aminosulfonic acid was dissolved in the presence of sodium hydroxide, followed by addition of hydrochloric acid and sodium nitrite to effect diazotization. Next, 6-amino-1-hydroxynaphthalene-3-sulfonic acid was dissolved in the presence of sodium hydroxide, followed by addition of acetic anhydride to effect acetylation. To this, the same diazotized turbid fluid as the above was dropwise added in the presence of sodium carbonate to effect coupling reaction to obtain a reaction fluid (B). To this reaction fluid (B), sodium hydroxide and then sodium chloride were added to effect salting-out to obtain a compound. This compound was dissolved in water in the presence of sodium hydroxide, followed by addition of hydrochloric acid and sodium nitrite to effect diazotization. To this diazotized turbid fluid, the reaction fluid (A) was dropwise added in the presence of sodium carbonate to complete coupling reaction to obtain a reaction fluid. This reaction fluid was salted out using sodium chloride, followed by filtration to obtain a compound (C).

2-Nitro-4-cresol, toluene and potassium hydroxide were added to N,N-dimethylformamide, and water was evapo rated off by azeotropy with toluene, where propanesultone was dropwise added, followed by addition of sodium hydroxide. This was concentrated, and thereafter, in an autoclave, palladium carbon was added thereto, followed by enclosure of hydrogen gas to obtain a solution. This solution was diazotized by adding hydrochloric acid and sodium nitrite, followed by dropwise addition of the above reaction fluid (A) to complete coupling reaction in the presence of sodium hydroxide to obtain a reaction fluid. This reaction fluid was diazotized by adding hydrochloric acid and sodium nitrite. This diazotized turbid fluid was added to an aqueous solution in which the above compound (C) was dissolved, to complete coupling reaction. This was salted out using sodium chloride, followed by filtration and washing to obtain a compound (α).

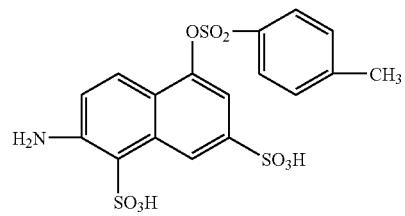

Formula (A)

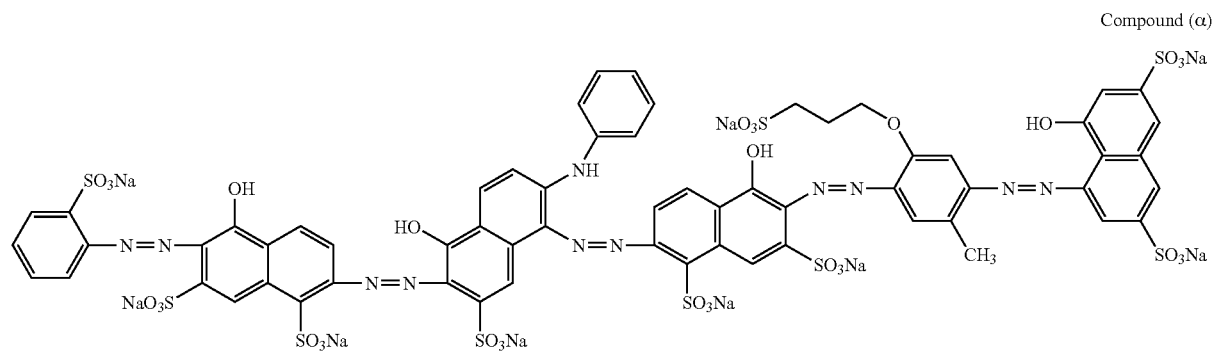

Compound (α)

<Preparation of Ink>

The components shown in Tables 3 and 4 below were mixed and sufficiently stirred. After that, the resultant mixture was filtered through a membrane filter having a pore size of 0.2 μm under pressure to prepare inks of Examples 1 to 7 and Comparative Examples 1 to 9.

TABLE 3

|  | Example | | | | | | |
|---|---|---|---|---|---|---|---|
|  | 1 | 2 | 3 | 4 | 5 | 6 | 7 |
| Compound (α) | 5.0 | 4.0 | 4.0 | 4.0 | 5.0 | 4.0 | 5.0 |
| C.I. Food Black 2 |  |  |  |  |  |  |  |
| Glycerol | 10.0 | 10.0 |  | 7.0 | 10.0 | 6.0 | 5.0 |
| Ethylene glycol | 10.0 | 10.0 |  |  | 10.0 | 6.0 | 5.0 |
| Ethyleneurea |  |  |  |  | 10.0 |  |  |
| Urea |  |  |  |  |  |  |  |
| 1,2-Propanediol |  |  |  |  |  |  |  |
| 1,3-Propanediol |  |  | 10.0 |  |  |  |  |
| 1,4-Butanediol |  |  | 7.0 |  |  |  |  |
| Diethylene glycol |  |  |  | 10.0 |  |  |  |
| 2-Pyrrolidone |  |  |  |  |  |  |  |
| 1,2,6-Hexanetriol |  | 5.0 | 5.0 | 5.0 |  | 10.0 | 9.0 |
| Diethylene glycol monobutyl ether |  |  |  |  |  |  |  |
| ACETYLONOL E100 (*1) | 1.0 | 1.0 | 1.0 | 1.0 | 1.0 | 1.0 | 1.0 |
| Ion-exchanged water | 74.0 | 70.0 | 73.0 | 73.0 | 64.0 | 73.0 | 75.0 |

(*1): an acetylene glycol ethylene oxide adduct (surfactant available from Kawaken Fine Chemicals Co., Ltd.)

TABLE 4

|  | Comparative Example | | | | | | | | |
| --- | --- | --- | --- | --- | --- | --- | --- | --- | --- |
|  | 1 | 2 | 3 | 4 | 5 | 6 | 7 | 8 | 9 |
| Compound (α) | 4.0 | 5.0 | 4.0 | 4.0 | 4.0 | 4.0 |  |  | 5.0 |
| C.I. Food Black 2 |  |  |  |  |  |  | 4.0 | 6.0 |  |
| Glycerol | 5.0 | 5.0 | 3.0 | 2.0 | 2.0 |  |  | 10.0 | 5.0 |
| Ethylene glycol | 5.0 | 4.0 | 3.0 | 2.0 |  |  |  |  |  |
| Ethyleneurea |  |  |  |  |  |  |  | 10.0 |  |
| Urea |  |  |  |  |  |  |  |  | 5.0 |
| 1,2-Propanediol |  |  |  |  |  |  |  | 10.0 |  |
| 1,3-Propanediol |  |  |  |  |  |  |  |  |  |
| 1,4-Butanediol |  |  |  |  |  |  |  |  |  |
| Diethylene glycol |  |  |  |  |  |  |  |  |  |
| 2-Pyrrolidone |  |  |  |  |  |  |  |  | 4.0 |
| 1,2,6-Hexanetriol | 9.0 | 10.0 | 13.0 | 15.0 | 17.0 | 20.0 | 20.0 |  |  |
| Diethylene glycol monobutyl ether |  |  |  |  |  |  |  |  | 2.0 |
| ACETYLONOL E100 (*1) | 1.2 | 1.0 | 1.0 | 1.0 | 1.0 | 1.0 | 1.0 | 1.0 | 0.1 |
| Ion-exchanged water | 75.8 | 75.0 | 76.0 | 76.0 | 76.0 | 75.0 | 75.0 | 63.0 | 78.9 |

(*1): an acetylene glycol ethylene oxide adduct (surfactant available from Kawaken Fine Chemicals Co., Ltd.)

<Production of Recording Medium>

To a pulp slurry containing 80 parts by mass of broad-leaved tree kraft pulp (LBPK) of 450 ml in CSF (Canadian standard freeness) and 20 parts by mass of needle-leaved tree kraft pulp (NBPK) of 480 ml in CSF, 0.60 part by mass of cationic starch, 10 parts by mass of heavy calcium carbonate 0.15 parts by mass of light calcium carbonate, 0.10 part by mass of an alkylketene dimer, 0.03 part by mass of cationic polyacrylamdie and 0.40 part by mass of aluminum sulfate were added to prepare a stock. Thereafter, the stock was machined with Fourdrinier paper machine, and three-stage wet pressing was carried out, followed by drying with a multi-cylinder dryer. Thereafter, the paper obtained was impregnated with an aqueous, oxidized starch solution by means of a size press apparatus so as to be in a solid content of 1.0 g/m$^2$, followed by drying and thereafter machine calender finishing to obtain a base paper of 155 g/m$^2$ in basis weight, 100 seconds in Stoechigt sizing degree, 50 seconds in air permeability, 30 seconds in Bekk smoothness and 11.0 mN in Gurley stiffness.

Next, on the base paper thus obtained, an undercoat layer was formed in the following way. First, a coating fluid used to form the undercoat layer was prepared. To a slurry having a solid-matter concentration of 70% and containing 100 parts by mass of a filler composed of caolin (ULTRA WHITE 90, available from Engelhard)/zinc oxide/aluminum oxide in 65/10/25 in mass ratio and part by mass of a commercially available polyacrylic acid type dispersing agent, 7 parts by mass of a commercially available styrene-butadiene type latex was added, which was adjusted so as to be in a solid content of 60% to obtain a composition. Next, the base paper was coated on its both sides with this composition by means of a blade coater so as to be in a dried coating weight of 15 g/m$^2$, followed by drying. Thereafter, this was put to machine calender finishing at a linear pressure of 150 kgf/cm to obtain a base paper with undercoat layer, of 185 g/m$^2$ in basis weight, 300 seconds in Stoechigt sizing degree, 3,000 seconds in air permeability, 200 seconds in Bekk smoothness and 11.5 mN in Gurley stiffness. Whiteness of the base paper with undercoat layer was measured in respect of A4-size five sample sheets each, having been cut in that size, and was determined as their average value. As the result, the whiteness was found to be L: 95, a*: 0 and b*: −2 (determined as the hue according to JIS Z 8729).

Next, an ink receiving layer was formed. In forming the ink receiving layer, the ink receiving layer was formed on the undercoat layer immediately after the coating in the above second step of surface treatment, namely, immediately after the undercoat layer came impregnated with the coating fluid.

A coating fluid and a coating method which were used to form the ink receiving layer were as shown below. Sodium aluminate was added to an aqueous 4 mass % aluminum chloride solution, and the pH of the solution obtained was adjusted to 4. Thereafter, this solution was heated to 90° C. with stirring; and the stirring was continued for a while. Thereafter, sodium aluminate was again added to this solution, and the pH of the solution obtained was adjusted to 10. Keeping its temperature at 90° C., ripening reaction was carried out for 40 hours. Thereafter, this solution was returned to room temperature, and its pH was adjusted to about 7 to 8 to obtain a fluid dispersion. This fluid dispersion was subjected to salting-out treatment, and thereafter subjected to deflocculation treatment with acetic acid to obtain a colloidal sol of an alumina hydrate. This colloidal sol was concentrated to obtain a 17 mass %. Also, polyvinyl alcohol (trade name: PVA117, available from Kuraray Co., Ltd.) was dissolved in pure water to obtain a 9 mass % solution.

The above colloidal sol and polyvinyl alcohol solution were so mixed that alumina hydrate solid content and polyvinyl alcohol solid content were in a mass ratio of 10:1, and then stirred to obtain a fluid dispersion. Using a die coater, the base paper with undercoat layer was so coated thereon with this fluid dispersion that the fluid dispersion was in a dried coating weight of 35 g/m$^2$. Thereafter, the wet coating on this base paper was dried at 170° C. to form the ink receiving layer. The surface of this ink receiving layer was put to rewet cast coating making use of hot water, by means of a rewet cast coater to obtain a recording medium.

<Relative Permittivity of Water-Soluble Organic Solvent>

The relative permittivity of the water-soluble organic solvent of various types was measured with LCR Meter 4284A (manufactured by Hewlett-Packard Japan, Ltd.)

under conditions of a room temperature of 20° C. and a measurement frequency of 1 MHz. The results are shown in Table 5.

TABLE 5

| Water-soluble organic solvent | Relative permittivity (measurement frequency: 1 MHz) |
|---|---|
| Glycerol | 43.0 |
| Ethylene glycol | 38.1 |
| 1,2-Propanediol | 32.2 |
| 1,3-Propanediol | 34.8 |
| 1,4-Butanediol | 31.3 |
| Diethylene glycol | 32.5 |
| 2-Pyrrolidone | 27.5 |
| 1,2,6-Hexanetriol | 28.5 |
| Diethylene glycol monobutyl ether | 10.3 |
| ACETYLONOL E100 (*1) | 8.2 |

(*1): an acetylene glycol ethylene oxide adduct (surfactant available from Kawaken Fine Chemicals Co., Ltd.)

<Solubility of Compound (α)>

50 g of an aqueous solution in which the coloring material stood dissolved was put into a 100 ml beaker (JIS R 3503), and this was left in a thermostatic chamber kept at a temperature of 60° C. and a humidity of 20%, followed by evaporation to dryness until changes in mass per 3 hours came to 0.01 gram or less. Then, the substance thus obtained was ground down with a mortar to obtain a powder. This powder was dissolved in the water-soluble organic solvent of various types at 25° C. until the solution came into saturation. The mass of the coloring material required for bringing the solution into saturation was divided by the total mass of the water-soluble organic solvent and coloring material, and the value thus obtained was regarded as the solubility (degree of solubility). The results are shown in Table 6.

TABLE 6

| Water-soluble organic solvent | Solubility (25° C.) |
|---|---|
| Glycerol | 14.9 |
| Ethylene glycol | 26.7 |
| 1,2-Propanediol | 1.5 |
| 1,3-Propanediol | 5.4 |
| 1,4-Butanediol | 1.1 |
| Diethylene glycol | 28.2 |
| 2-Pyrrolidone | 22.3 |
| 1,2,6-Hexanetriol | 1.8 |
| Diethylene glycol monobutyl ether | 0.011 |
| ACETYLONOL E100 (*1) | 0.025 |

(*1): an acetylene glycol ethylene oxide adduct (surfactant available from Kawaken Fine Chemicals Co., Ltd.)

<Evaluation>

Evaluation was made on the following items according to the following criteria.

(Optical Density)

Each of the inks of Examples 1 to 7 and Comparative Examples 1 to 9 thus prepared were mounted on an ink jet printer manufactured by CANON INC. (trade name: BJ F900), and solid pattern with an ink applied duty of 100% were printed on the recording medium thus prepared in an environment of temperature 25° C. and humidity 60%. Recorded articles obtained were dried for 24 hours in the environment of temperature 25° C. and humidity 60%, and optical density (image density) was measured on the images having been dried. Incidentally, a spectrophotometer (SPECTROLINO, manufactured by Gretag Macbeth Holding AG) was used in the measurement. The criteria of optical density are as shown below. The results of evaluation are shown in Table 7.

AA: Optical density is 2.50 or more.
A: Optical density is from 0.2.45 or more to less than 2.50.
B: Optical density is from 2.40 or more to less than 2.45.
C: Optical density is less than 2.40.

(Sticking Recovery Property)

Each of the inks of Examples 1 to Hand Comparative Examples 1 to 9 thus prepared was filled in a recording head of the ink jet printer manufactured by CANON INC. (trade name: BJ F900). Thereafter, the recording head was detached, and, in the state its ejection orifices were exposed to the environmental atmosphere, was left for 2 weeks in an environment of temperature 35° C. and humidity 15%. Thereafter, the recording head was again-mounted to the printer main body, and ink purging maintenance operation and printing were performed to evaluate the sticking recovery property. Criteria of the sticking recovery property are as shown below. The results of evaluation are shown in Table 7.

A: After the recording head is mounted, all nozzles are maintenanced by purging made twice or less, to become ejection-capable without any problem.
B: After the recording head is mounted, all nozzles are maintenanced by purging made three times or four times, to become ejection-capable without any problem.
C: After the recording head is mounted, some nozzles remain ejection-incapable even by purging made five times or more.

TABLE 7

| | | Dye of the present invention? | Proportion of water-soluble organic solvent having solubility of 1.0 mass % or more (*2) | Optical density | Sticking recovery property |
|---|---|---|---|---|---|
| Example | 1 | Yes | 95.2 | AA | A |
| | 2 | Yes | 76.9 | AA | A |
| | 3 | Yes | 73.9 | AA | A |
| | 4 | Yes | 73.9 | AA | A |
| | 5 | Yes | 64.5 | AA | A |
| | 6 | Yes | 52.2 | AA | A |
| | 7 | Yes | 50 | AA | A |
| Comparative Example | 1 | Yes | 49.5 | B | A |
| | 2 | Yes | 45.0 | B | A |
| | 3 | Yes | 30.0 | B | A |
| | 4 | Yes | 20.0 | B | A |
| | 5 | Yes | 10.0 | B | A |
| | 6 | Yes | 0.0 | C | B |
| | 7 | No | 0.0 | C | B |
| | 8 | No | 64.5 | C | A |
| | 9 | Yes | 31.1 | A | C |

(*2): Percent (%) by mass of content of the water-soluble organic solvent capable of dissolving the compound represented by the general formula (I) or a salt thereof by 1.0 mass % or more at 25° C., with respect to the total content of water-soluble organic solvents contained in the ink jet black ink.

The present application claims the priority from each of Japanese Patent Application No. 2004-196448 filed on Jul. 2, 2004 and Japanese Patent Application No. 2005-192194 filed on Jun. 30, 2005, which is hereby incorporated by reference herein.

What is claimed is:

1. An ink jet black ink comprising at least a coloring material and a water-soluble organic solvent, wherein the coloring material comprises a compound represented by the following general formula (I) or a salt thereof, and wherein the water-soluble organic solvent is a water-soluble organic solvent having a relative permittivity of from 30.0 or more to less than 70.0 at 20° C. and capable of dissolving the compound represented by the following general formula (I) or a salt thereof, by 1.0 mass% or more at 25° C., and is in a content of 50.0 mass% or more with respect to the total content of all water-soluble organic solvents contained in the ink jet black ink:

General formula (I)

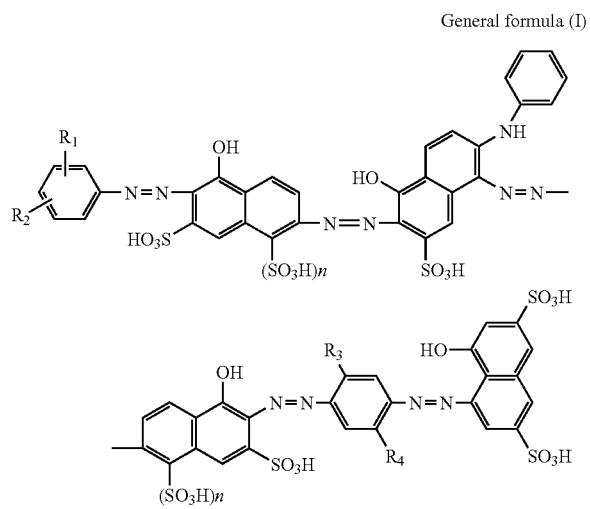

wherein $R_1$ and $R_2$ each independently represent a hydrogen atom, a hydroxyl group, an amino group, a carboxyl group, a sulfonic group, an alkyl group having 1 to 4 carbon atoms or an alkoxyl group having 1 to 4 carbon atoms; and $R_3$ and $R_4$ each independently represent a hydrogen atom, an alkyl group having 1 to 4 carbon atoms, an alkoxyl group having 1 to 4 carbon atoms, a hydroxyl group, an alkyl group having 1 to 4 carbon atoms which may be substituted with a hydroxyl group or with an alkoxyl group having 1 to 4 carbon atoms, an alkoxyl group having 1 to 4 carbon atoms which may be substituted with a hydroxyl group, with an alkoxyl group having 1 to 4 carbon atoms, with a sulfonic group or with a carboxyl group, or an amino group which is substituted with an alkyl group or with an acyl group; and n represent 0 or 1.

2. The ink jet black ink according to claim 1, wherein the water-soluble organic solvent having a relative permittivity of from 30.0 or more to less than 70.0 at 20° C. and capable of dissolving the compound represented by the following general formula (I) or a salt thereof, by 1.0 mass% or more at 25° C. is a solvent selected from the group consisting of glycerol, ethylene glycol, diethylene glycol, 1,2-propanediol, 1,3-propanediol and 1,4-butanediol.

3. An ink set, comprising a plurality of inks, which comprises the ink jet black ink according to claim 1 as a black ink.

4. An ink jet recording method, comprising ejecting an ink by ink jet method, wherein the ink comprises the ink jet black ink according to claim 1.

5. An ink cartridge, comprising an ink storage portion for storing ink, wherein the ink comprises the ink jet black ink according to claim 1.

6. A recording unit, comprising an ink storage portion for storing the ink and a recording head for ejecting the ink, wherein the ink comprises the ink jet black ink according to claim 1.

7. An ink jet recording apparatus, comprising an ink storage portion for storing the ink and a recording head for ejecting the ink, wherein the ink comprises the ink jet black ink according to claim 1.

* * * * *

UNITED STATES PATENT AND TRADEMARK OFFICE
CERTIFICATE OF CORRECTION

PATENT NO. : 7,144,452 B2  Page 1 of 1
APPLICATION NO. : 11/321644
DATED : December 5, 2006
INVENTOR(S) : Hideki Takayama et al.

It is certified that error appears in the above-identified patent and that said Letters Patent is hereby corrected as shown below:

COLUMN 1
Line 16, "recoding" should read --recording--.
Line 58, "come into contact" should read --coming into contact with--.

COLUMN 2
Line 59, "promise" should read --promises--.

COLUMN 3
Line 48, "pre sent" should read --present--.
Line 60, "solvent-having" should read --solvent having--.

COLUMN 5
Line 40, "has" should read --has been--.

COLUMN 17
Line 18, "perspective-view" should read --perspective view--.

COLUMN 20
Line 67, "evapo" should read --evapo- --.

COLUMN 26
Line 10, "Hand" should read --7 and--.

Signed and Sealed this

First Day of May, 2007

JON W. DUDAS
*Director of the United States Patent and Trademark Office*